July 19, 1966  R. S. RAE  3,261,209
METHOD AND APPARATUS FOR MEASURING ANGULAR RATE AND POSITION
Filed Dec. 11, 1962

INVENTOR.
RANDOLPH S. RAE
BY *Elliott & Pastoriza*
ATTORNEYS

United States Patent Office 3,261,209
Patented July 19, 1966

3,261,209
METHOD AND APPARATUS FOR MEASURING
ANGULAR RATE AND POSITION
Randolph S. Rae, 11740 Sunset Blvd.,
Los Angeles 49, Calif.
Filed Dec. 11, 1962, Ser. No. 243,805
15 Claims. (Cl. 73—505)

This invention relates generally to systems for indicating spatial movements and more particularly to a novel method and apparatus for indicating angular rate and position relative to an angularly invariant frame of reference in space.

Angular rate and position are conventionally indicated by gyroscope systems. Accurate gyroscopic indicating systems, however, require expensive and precisely manufactured equipment. Furthermore, most gyros conventionally employed are relatively bulky, are subject to drift which requires additional equipment for compensation, and generally require a "run-up" time before they are useful.

With the foregoing in mind, it is a primary object of the present invention to provide a novel method and apparatus for measuring angular rate and position in which the foregoing disadvantages are substantially avoided.

More particularly, it is an object to provide a novel method and apparatus for indicating angular rate and position in a manner far more economical and less complicated than has characterized prior art angular rate and position indicators.

Another object is to provide a novel method and apparatus for measuring angular rate in which drift is materially reduced compared to conventional gyroscopic systems.

Another important object is to provide an improved method and apparatus for measuring angular rate and position which requires an appreciably less "run-up" time than characterizes conventional gyroscopes.

In accordance with the method of the invention, a fluid is caused to move in a direction having a radial component with respect to an axis about which angular rate is to be measured. In the next step of the method, a detectable characteristic is imparted to a portion of the fluid at a first given point in the fluid path. This detectable characteristic is then sensed at a second point in the fluid path, a fixed distance from the first point. The transit time of the fluid portion may then be determined, and this transit time is a direct function of the angular rate of rotation with respect to the given axis. One way of measuring this transit time is by imparting the detectable characteristic to successive portions of fluid in response to the sensing of previous portions respectively. The frequency at which sensing occurs will then be a function of the transit time. Alternatively, the transit time may be measured directly.

Further steps in the method include the moving of a second fluid in an identical manner to that of the first fluid and then imparting intentional rotations in opposite directions to the first and second fluids to provide first and second sensing frequencies. These frequencies may then be made the same in the absence of any external angular rotation whereas if such an external angular rotation does exist, a difference frequency will be developed. This difference frequency in turn may be employed to operate a motor which will provide a rotation of the equipment in such a manner as to null the external angular rotation so that the sensing frequencies are again made equal. The final positioning of the equipment incorporating the fluids will thus provide an indication of the external angular rotation as to both rate and extent.

The preferred apparatus for carrying out the method comprises a casing structure incorporating a fluid which is caused to flow in a direction from the periphery of the casing towards the center of the casing. A central axis passing through the center of the casing constitutes a reference axis about which angular rate is to be measured. Within the fluid path, there are provided transferring means and sensing means for imparting a characteristic to the fluid and sensing such a characteristic a short time later as the fluid travels radially inwardly. Any rotation imparted to the casing will result in a change in the transit time between the transferring and sensing means which may be detected by suitable apparatus connected to the transferring and sensing means.

If an intentional constant rate of rotation is imparted to the casing and if the transferring means is made responsive to the sensing means, an output sensing frequency may be provided which is a function of the angular rate of rotation. By providing a second casing rotated in an opposite direction, a second sensing output frequency is provided which may be balanced against the first frequency to provide a zero difference frequency when both rotations are equal and opposite in direction. If now an external angular change occurs, both casings will be subjected to this movement which will subtract from one angular rotation and add to the other angular rotation thereby resulting in a difference frequency which may be used as an indicating signal.

In the preferred form of the apparatus, the difference frequency indicating signal is used to servo both of the casings in a rotational direction to null the external angular rotation so that the final positioning of the apparatus constitutes a measure of the total external angular movement. By measuring the rate of rotation of the apparatus by the servo-system, the external angular rate may be indicated.

A better understanding of the invention will be had by now referring to the accompanying drawings, in which.

Figure 1:
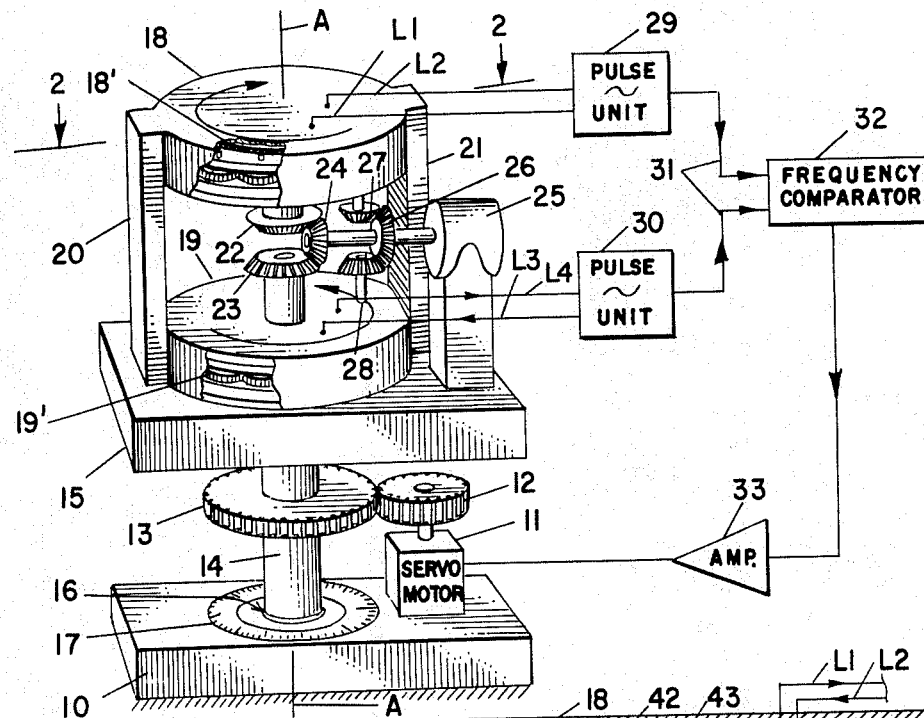
FIGURE 1 is a highly schematic view partly incorporating a block diagram illustrating the basic components making up the angular rate and position indicating apparatus of this invention.

Referring first to FIGURE 1, the preferred embodiment of the apparatus includes a base support 10 rigidly secured to a vehicle such as a ship, aircraft, or other structure subject to angular rotation, the extent of which it is desired to measure. The base 10 supports a servo-motor 11 coupled through gears 12 and 13 to a shaft 14 having its lower end rotatably mounted in the base 10. The upper end of the shaft 14 in turn is secured to a supporting means in the form of a table 15 so that rotation of the shaft will rotate the table about an axis A—A. As shown, the shaft 14 includes a pointer 16 so that its angular position and that of the table 15 with respect to a scale 17 on the base 10 may be indicated.

The table 15 serves as a supporting means for first and second housings 18 and 19. These housings are positioned in co-axial relationship with respect to the vertical axis A—A by support members 20 and 21 and include in their interiors first and second casings 18' and 19' adapted to be rotated by means of shafts terminating in end bevel gears 22 and 23. A drive bevel gear 24 is coupled to the bevel gears 22 and 23 and driven by a motor 25 stationarily secured to the table 15. With this arrangement, the motor 25 may turn the bevel gear 24 at a constant speed to rotate the casings within the housings 18 and 19 in opposite directions and at equal angular rates relative to the table 15. A second drive bevel gear 26 is also driven by the motor 25 and coupled to bevel gears 27 and 28 to drive suitable pump means within the housings 18 and 19 as will become clearer as the description proceeds.

First signal leads $L_1$ and $L_2$ connect from the housing 18 to a pulse frequency unit 29. Similarly, second signal leads $L_3$ and $L_4$ connect from the second housing 19 to a second pulse frequency unit 30. The outputs 31 from the units 29 and 30 in turn are fed into a frequency comparator 32. Any output signal from the frequency comparator 32 is passed through a servo-amplifier 33 to drive the servo motor 11.

The operation of the device as described in conjunction with FIGURE 1 is briefly as follows: The casing 18′ within the housing 18 receives a transfer signal on the lead $L_1$ from the unit 29 and returns a sensing signal on the lead $L_2$. This sensing signal in turn triggers the initiation of another transfer signal which results in another sensing signal and so forth. The pulse frequency unit 29 will provide an output sensing frequency proportional to the rate of reception of the sensing signal. This rate of reception is in turn a function of the angular rate of movement of the casing 18′ about the axis A—A. A similar sensing frequency is derived from the pulse frequency unit 30 for the casing 19′ within the housing 19 which as described is rotated at an equal rate to the casing 18′ but in an opposite direction. With the table 15 rotationally stationary in space, the output frequencies from the units 29 and 30 can be made equal. The frequency comparator 32 is designed to provide a signal of a polarity and magnitude determined by the difference between the frequencies from the units 29 and 30. The output signal from the comparator is thus zero when the input frequencies are equal.

If now an angular rotation occurs about the axis A—A, this angular rotation will be added to the rotation of one of the casings and subtracted from the rotational rate of the other of the casings. As a consequence, there will be developed a frequency difference which will yield a signal from the frequency comparator 32. This signal is amplified in the servo-amplifier 33 to drive the servo-motor 11 in a direction and at a rate such as to rotate the table 15 in a direction and at a rate to counter the particular external angular movement about the axis A—A. Thus, the angular rate and angular position of the table 15 will be shown by the pointer 16 with respect to the scale 17.

The manner in which first and second sensing frequencies are provided from the rotating casings 18′ and 19′ as functions of their angular rates of rotation about the axis A—A will be better understood by now referring to FIGURES 2, 3, 4, and 5.

Figure 2:
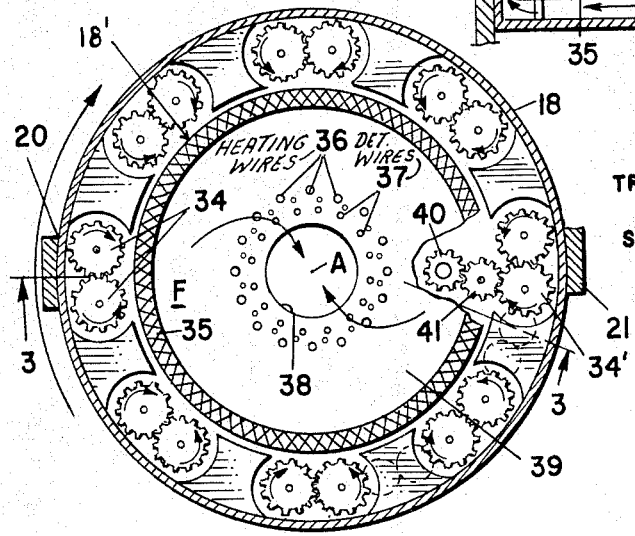
FIGURE 2 is a cross section taken generally in the direction of the arrows 2—2 of FIGURE 1.
Figure 5:
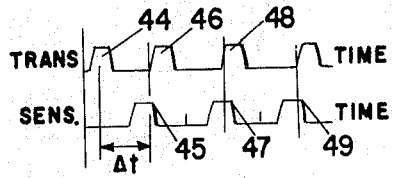

Referring first to FIGURE 2, the housing structure 18 includes pump means in the form of gear pumps 34 circumferentially distributed about the housing periphery. The casing 18′, in turn, includes an annular porous screen 35 in a position to receive fluid F from the various gear pumps. These pumps serve to direct the fluid in a direction having a radial component with respect to the axis A—A so that the fluid will pass from the peripheral portions of the casing towards the central portion thereof.

As shown, the casing further includes transferring means in the form of first equally radially spaced vertical grid wires 36 adjacent the central portion of the casing and sensing means in the form of second vertical pairs of grid wires 37 radially spaced a lesser distance from the center axis A—A. A central opening 38 is provided in a lower floor plate 39 to permit the fluid F to pass through the central opening 38 and reverse its direction of flow under the floor plate 39 towards the outer periphery of the housing. The various gear pumps are driven by a suitable gear train beneath the plate 39, a portion of which is illustrated in the broken-away view. Thus, the gear 40 is driven by the shaft for bevel gear 27 of FIGURE 1 and is coupled through gear 41 to the gear 34′ connected to gear pump 34.

Figure 3:
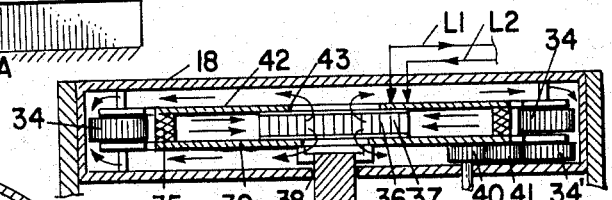
FIGURE 3 is another cross section taken in the direction of the arrows 3—3 of FIGURE 2.

The foregoing arrangement will be better understood by referring to FIGURE 3 wherein the gear arrangement is illustrated below the plate 39. As also shown in FIGURE 3, there is provided an upper plate 42 having a central opening 43 and cooperating with the lower plate 39 to define a top and bottom of the casing. As indicated by the arrows, the fluid will flow from the various gear pumps 34 between the plates 39 and 42 to pass the transferring means in the form of the grid wires 36 and the sensing means in the form of the grid wires 37 and thence out the central openings 38 and 43 back towards the periphery of the casing.

The shaft from the bevel gear 22 illustrated in FIGURE 1 extends into the housing 18 to connect to the casing so that the casing structure will be rotated within the housing. The connecting leads $L_1$ and $L_2$ described in conjunction with FIGURE 1 pass through slip rings to connect to the grid wires 36 and 37, respectively.

The casing structure 19′ in the second housing 19 is identical to that described in FIGURES 2 and 3.

In operation, consider first the casing structure within the housing 18. If this casing is caused to rotate in a clockwise direction as viewed from above and as indicated by the arrow in FIGURE 1, the fluid passing from the gear pump means 34 will follow a spiral path as indicated by the arrows in FIGURE 2. Portions of the fluid will flow past the transferring means in the form of the grid wires 36 to the sensing means in the form of the grid wires 37. The grid wires 36 are provided with electrical pulses of energy such as might be provided by a simple pulse generator which will heat them momentarily. This heat serves as a detectable characteristic which is transferred to a portion of fluid passing the wires at substantially the instant that the wire is heated. This portion of fluid when it passes the second grid wires 37 will transfer its heat to the second grid wires thereby changing their resistance to enable a signal to be generated in response to passing of the heated portion which signal may be detected by any suitable electronic means and employed to trigger the pulse generator.

Figure 4:
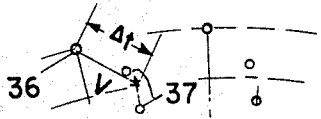
FIGURE 4 is a schematic diagram useful in explaining the operation of the invention; and, FIGURE 5 illustrates two time graphs useful in explaining further features of the invention.

Referring specifically to FIGURE 4, there is illustrated one of the outer grid wires 36 and one pair of the inner grid wires 37. It will be noted that the grid wires 37 are circumferentially displaced slightly from the grid wires 36. The points at which the grid wires 36 and 37 are located fall in the spiral path of fluid flow. The time it takes a portion of fluid which is heated to pass from the wire 36 to the wire 37 will depend upon its velocity V. This time is indicated by $\Delta t$ as shown in FIGURE 4. If the rate of rotation of the casing within the housing 18 is changed, the peripheral velocity initially imparted to the fluid by the porous screen 35 will also be changed which will change the value of the velocity V of the fluid portion between the grid wires 36 and the grid wires 37 and thereby change the value of $\Delta t$. The porous screen 35 of FIGURE 2 serves to direct the fluid generally radially inwardly and impart to it the peripheral velocity of the casing.

The rate at which heating energy is applied to the grid wires 36 may be controlled by the transit time $\Delta t$. Thus, referring to FIGURE 5, if the pulse 44 represents a pulse of electrical energy supplied to the grid 36 to heat the same, at a time $\Delta t$ later, there will be detected a change of resistance in the sensing grid wires 37 giving rise to a pulse 45. If the pulse 45 in turn is arranged to trigger the initiation of a successive electrical pulse 46 to provide a heating and the resulting sensing pulse 47 is used to trigger the next pulse 48, the frequency of the sensing pulses 45, 47, and 49 will be a measure or indication of the transit time $\Delta t$. It is this sensing frequency which is provided at the output of the pulse frequency unit 29 of FIGURE 1.

Since the casing within the housing 19 of FIGURE 1 is rotated in an opposite direction, the fluid therein will follow spiral paths opposite to that depicted by the arrows in FIGURE 2. If the rate of rotation of the casing 19' is equal to the rate of rotation of the casing 18', the sensing frequency provided by the pulse frequency unit 30 may be made identical to the sensing frequency from the pulse frequency unit 29, provided that no external angular rotation is present.

If now, there is an external angular rotation to be measured, this angular rotation will result in rotation of the entire base structure 10, table 15, and both the casings within the housings 18 and 19 about the axis A—A. The exterior angular rotation to be measured will thus add to the angular rotation of one of the fluids in one of the casings and subtract from the angular rotation of the fluid in the other of the casings. There will thus result a difference in the output frequencies from the units 29 and 30 and this difference in frequency will be a function of the exterior angular rotation.

The frequency comparator 32 may be designed to provide a positive signal when the frequency from the pulse frequency unit 29 exceeds the frequency from the pulse frequency unit 30 and a negative signal when the sensing frequency from the unit 29 is less than the sensing frequency from the unit 30. Further, the magnitude of the signal from the frequency comparator may be proportional to the actual frequency difference. Therefore, the signal passed from the amplifier 33 to the servo motor 11 will provide an indication of both the direction and magnitude of external angular rotation.

The servo motor is designed to rotate in a direction determined by the polarity of the input signal and as described in the operation of FIGURE 1, will rotate the table 15 in a direction counter to the exterior angular rotation and thus null this angular rotation so that the frequency difference between the sensing frequencies from the units 29 and 30 will be equalized. When these frequncies are equal, the signal output from the frequency comparator 32 will be zero, and the servo motor will stop. Suitable servoloop controls in the form of anticipation means (not shown) may be provided to avoid hunting.

It will thus be understood from the foregoing description that the rate of movement of the pointer 16 with respect to the base 10 will be a direct measure of the angular rate exteriorly influencing the apparatus whereas the final positioning of the pointer 16 with respect to the scale 17 will provide the integrated result of such angular rate or the new position resulting from the exterior angular movement. Stated somewhat differently, as a consequence of the servo feedback loop, the shaft 14 and table 15 are retained substantially rotationally stationary in space so that the apparatus on the table 15 is essentially invariant insofar as rotation is concerned. The rotation that will be measured will then result in the stationary base 10 changing its position with respect to the pointer 16 so that a direct reading of angular rotation is provided.

Preferably, a liquid hydro-carbon fluid is employed within the casings so that the same is incompressible and the radial velocity may be fixed at a relatively constant value. Since the same motor 25 drives both the casing in rotation and the gear pumps, the radial velocity component of the fluid imparted by the gear pumps is locked in a given proportion to the rotation rate of the casing. Thus, if the rotation of the casing slows, the velocity of the fluid will likewise decrease.

By using two casings rotating in opposite directions as described, variations common to both, such as temperature influences, will cancel out. Further, while there may be a slight change in the direction of fluid flow under severe angular rate changes, by employing the servo feedback system, the fluid flow paths within the casings are always returned to a configuration designed in accordance with the circumferential displacement of the transferring and sensing grid wires so that the grid wires will lie on points on the path of fluid flow. Since the heated portion of the fluid constitutes an actual mass of fluid, small variations in the direction of the velocity vector V as shown in FIGURE 4 will not appreciably affect the magnitude of sensing signals received. The measurement made as described is of the transit time which is a direct function of the speed or magnitude of the velocity vector and it is this quantity which is most affected by a change in angular rate.

It should further be understood that while the heating of a portion of the fluid has been described as the detectable characteristic imparted to the fluid, other means of identifying a given portion of fluid for later detection could be employed.

The method and apparatus of this invention are therefore not to be thought of as limited to the exact description set forth merely for illustrative purposes.

What is claimed is:

1. A method of indicating angular rate and position, comprising the steps of: moving a fluid in a path having a radial component relative to an axis about which said angular rate is to be indicated; imparting a detectable characteristic to a portion of said fluid during the moving thereof at a first given point in said path; sensing said detectable characteristic in said portion of fluid when it passes a second given point in said path, the transit time of said portion from said first to said second point being a function of angular rate of movement with respect to said axis; and using said transit time to provide an indication of said angular rate.

2. The method of claim 1, including the step of imparting said detectable characteristic repeatedly to successive spaced portions of said fluid, each successive imparting being responsive to the sensing of the previous portion of fluid whereby the frequency of sensing of said portions is a function of said transit time.

3. The method of claim 2, including the step of rotating said fluid at a constant angular rate in a first direction relative to said axis to provide a first sensing frequency, and repeating the steps of claims 1 and 2 with a second fluid and rotating said second fluid in an opposite direction at said constant angular rate with respect to said axis to provide a second sensing frequency equal to said first mentioned sensing frequency in the absence of any angular rotation to be indicated whereby the existence of an angular rotation to be indicated results in a difference in said first and second sensing frequencies, said difference constituting a function of said angular rotation to be indicated.

4. The method of claim 3, including the step of rotating both said first and second fluids simultaneously in like directions in accordance with the difference in said frequency until said difference is nulled whereby the rate of movement and final positioning of said fluids provides an indication of said angular rate and angular position to be indicated.

5. The method of claim 4, in which said fluid is a liquid and said detectable characteristic constitutes a heating of a portion of said fluid to provide a heated portion.

6. The method of claim 5, including the step of moving said fluid in the direction of said radial component at a speed in fixed proportion to said constant angular rate.

7. An apparatus for indicating angular rate and position comprising, in combination: a fluid; means for moving said fluid in a path having a radial component with respect to an axis about which said angular rate is to be indicated; and means for indicating the transit time of a given portion of said fluid between first and second points in said path, said transit time being a function of the angular rate of rotation of said fluid whereby said angular rate about said axis may be indicated.

8. An apparatus for indicating angular rate and position comprising, in combination: a first casing having a central axis about which angular rate is to be indicated; a fluid in said casing; means for circulating said fluid from the inside periphery of said casing towards said central axis and back towards said periphery so that said fluid follows a path having a radial component with respect to said central axis; transferring means for imparting a detectable characteristic to a portion of said fluid at a first point in said path; sensing means for sensing said detectable characteristic at a second point in said path; and means responsive to said transferring means and sensing means for indicating the transit time of said portion of fluid from said first point to said second point, said transit time being a function of the angular rate of movement of said fluid relative to said central axis whereby the angular rate of said apparatus in space is indicated.

9. An apparatus according to claim 8, in which said transferring means is connected to said sensing means to be responsive to the sensing of said detectable characteristic in one portion of fluid to transfer said detectable characteristic to a successive portion of fluid whereby the frequency of sensing by said sensing means constitutes a function of said transit time.

10. An apparatus according to claim 9, including a second casing having a central axis co-axial with said first-mentioned central axis and including identical components as outlined in claim 8 for said first casing; means for rotating said first and second casings in opposite directions simultaneously to provide first and second sensing frequencies, said sensing frequencies being equal to each other when the rotational rates of said first and second casings are equal and there is an absence of any angular rate of rotation to be measured; and means connected to said first and second casings for providing an indication of the difference in said first and second sensing frequencies in response to an angular rotation whereby the rate of angular rotation may be indicated.

11. An apparatus according to claim 10, including a supporting means for said first and second casings; and servo-motor means for rotating said supporting means thereby rotating said first and second casings simultaneously, the axis of rotation of said supporting means being co-axial with said central axis for said casings, said servo-motor being connected to be responsive to a difference in said first and second sensing frequencies to rotate said supporting means in a direction to null the angular rotation providing said difference in sensing frequencies whereby the rate of movement and final positioning of said supporting means constitutes an indication of the angular rate and position to be indicated.

12. An apparatus for indicating angular rate and position comprising, in combination: a first housing; a first casing in said housing having a central axis about which said angular rate is to be indicated; a fluid in said casing; pump means in said housing for circulating said fluid from the inside periphery of said casing towards said central axis and back towards said periphery so that said fluid follows a path having a radial component with respect to said central axis; an annular shaped porous means positioned adjacent the inside periphery of said casing to receive said fluid from said pump means and pass said fluid towards said central axis of said casing; transferring means for imparting a detectable characteristic to a portion of said fluid at a first point in said path; sensing means for sensing said detectable characteristic at a second point in said path, said transferring means being responsive to said sensing means for imparting said detectable characteristic to a successive portion of said fluid so that the frequency of sensing said detectable characteristic constitutes a function of the transit time of said portions of said fluid between said first point and said second point in said path; and means for rotating said casing at a given constant angular rate to provide a given constant first sensing frequency in the absence of any angular rotation to be measured, said first sensing frequency increasing when an angular rate to be measured is in the same direction as the constant angular rate of rotation of said casing, and said sensing frequency decreasing when said angular rate to be indicated is opposite in direction to said constant angular rate of rotation of said casing whereby the direction and rate of angular rotation to be indicated is indicated by the direction and change in said sensing frequency from said given constant sensing frequency.

13. An apparatus according to claim 12, in which said transferring means comprises a plurality of grid wires positioned at equal radial distances from said central axis and said sensing means comprises a plurality of second pairs of grid wires positioned at lesser equal radial distances from said central axis, said detectable characteristic imparted to a portion of said fluid constituting heat so that portions of said fluid are heated, said heated portions being detected by said second grid wires.

14. An apparatus according to claim 12, in which said pump means is driven by said means for rotating said first casing at said given constant angular rate whereby the radial component of velocity of said fluid is in a fixed proportion to said given constant angular rate.

15. An apparatus according to claim 12, including a second casing having a central axis co-axial with said first mentioned central axis and including a fluid, pump means for circulating said fluid, transferring means, and sensing means, all substantially identical to said pump means, transferring means, and sensing means for said first-mentioned casing respectively; supporting means for supporting said first and second casings in co-axial relationship; means for rotating said second casing at a constant angular velocity in a direction opposite to the constant angular velocity at which said first casing is rotated to provide a second sensing frequency; frequency comparing means connected to receive said first sensing frequency and said second sensing frequency to provide an output signal that constitutes a function of the difference of said first sensing frequency and said second sensing frequency; and servo-motor means repsonsive to said difference frequency and connected to said supporting means to rotate said supporting means at a rate and in direction constituting a function of the polarity and magnitude of said difference signal whereby the rate of movement and final positioning of said supporting means constitutes an indication of the angular rate and position to be indicated.

References Cited by the Examiner

UNITED STATES PATENTS

| | | | |
|---|---|---|---|
| 2,203,824 | 6/1940 | Kollsman | 33—204.3 |
| 2,215,447 | 9/1940 | Kollsman | 33—204.3 |
| 2,975,641 | 3/1961 | Lees | 73—516 |
| 3,203,237 | 8/1965 | Ogren. | |

LOUIS R. PRINCE, *Primary Examiner.*

CHESTER L. JUSTUS, KATHLEEN H. CLAFFY,
*Examiners.*